United States Patent [19]
Shibata et al.

[11] Patent Number: 5,402,343
[45] Date of Patent: Mar. 28, 1995

[54] SAFETY DEVICE FOR AN AUTOMOBILE VEHICLE

[75] Inventors: Mineharu Shibata; Kenji Shodai; Junichi Miyawaki; Etsuko Yamamoto, all of Hiroshima, Japan

[73] Assignees: Mazda Motor Corporation; Naldec Corporation, both of Hiroshima, Japan

[21] Appl. No.: 93,894

[22] Filed: Jul. 20, 1993

[30] Foreign Application Priority Data

Jul. 21, 1992 [JP] Japan .................. 4-215581

[51] Int. Cl.$^6$ .................. B60R 21/32; B60R 21/16
[52] U.S. Cl. .................. 364/424.05; 340/436; 307/10.1; 280/735; 180/282
[58] Field of Search .................. 364/424.05; 340/436, 340/437, 438; 280/735; 180/274, 282; 307/10.1

[56] References Cited

U.S. PATENT DOCUMENTS

| | | | |
|---|---|---|---|
| 3,633,159 | 1/1972 | Dillman et al. | 180/274 |
| 3,767,002 | 10/1973 | Gillund | 180/274 |
| 4,410,875 | 10/1983 | Spies et al. | 280/735 |
| 5,173,614 | 12/1992 | Woehrl et al. | 307/10.1 |
| 5,202,831 | 4/1993 | Blackburn et al. | 364/424.05 |
| 5,208,484 | 5/1993 | Okano et al. | 307/10.1 |
| 5,225,985 | 7/1993 | Okano | 364/424.05 |
| 5,256,904 | 10/1993 | Tohbaru | 307/10.1 |

*Primary Examiner*—Gary Chin
*Assistant Examiner*—Tyrone V. Walker
*Attorney, Agent, or Firm*—Fish & Richardson

[57] ABSTRACT

A safety device for an automobile vehicle includes a first integration circuit for integrating an output value generated from a G sensor and a decision circuit for comparing the integrated value with a predetermined decision level to determine whether the safety device should be activated. In the first integration circuit, a previously integrated value is incrementally reduced to provide a current integrated value.

19 Claims, 4 Drawing Sheets

SAFETY DEVICE FOR AN AUTOMOBILE VEHICLE

BACKGROUND OF THE INVENTION

1. Field of the Invention

The present invention relates to a safety device for an automobile vehicle. More particularly, this invention relates to a safety device for an automobile vehicle, such as an air bag or the like, which is as adapted as to protect a driver and a passenger at the time of a collision such as a car crash by operating the safety device at an appropriate timing.

2. Description of the Related Art

Recently, there is the increasing tendency for automobile vehicles to be provided with a safety device that is operated at the time of a collision, such as a car crash or the like, in order to protect a driver and a passenger. The safety devices include, for example, an air bag that is arranged to inflated in car compartment at the time of a collision and a pretension-type seat belt that is designed so as to become in a tension state or in a pulled state at the time of a collision.

Such safety devices, however, are required to-be operate with the highest certainty at the time of a collision which damages the vehicle body and causes the driver or the passengers to be injured to a severe extent. However it is not required to operate at the time of a collision which does not cause the driver or the passengers injury or in which a portion of the vehicle body such as a bumper is damaged and destroyed to some extent.

In order to satisfy these requirements, proposals have been made to have automobile vehicles provided with a means for deciding a timing of operating a safety device by computing an output signal generated from a G sensor at the time of a collision or an acceleration sensor mounted to the vehicle body.

For example, Japanese Patent Unexamined Publication (kokai) Nos. 3-148,348 and 3-114,944 propose that an output signal generated from the G sensor at the time of a collision is subjected to integration and the integrated value is compared with a predetermined value. More specifically, a decision is made to determine if the safety device is to be operated by determining the necessity of operation of the safety device on the basis of the state of the collision or an impact energy at the time of the collision, as indicated by the value obtained by the integration of the output value therefrom.

In order to offer appropriate protections to the driver and the passengers by operating the safety device for the automobile vehicle, it is desired that the safety device is arranged to operate at an appropriate time. For instance, it is required that the safety device should operate at the timing earlier when the car has collided head-on with another car or the like at such a high speed as likely to severely injure the driver or the passenger. Further, for example, it is desired that the safety device should operate at a relatively late or delayed time when the car has collided with another car or the like to such an extent as damaging a portion of the vehicle body yet not likely causing driver nor passenger injury at all or severe injury.

When an integration means is set to integrate the output signal generated from the G sensor in order to satisfy the requirement for operating the safety device at a late or somewhat delayed, time, on the one hand, it should be noted that it may become difficult to sufficiently satisfy the requirement for operating the safety device at an immediate time as when the strong and rapid output signal has been generated from the G sensor. When the integration means is set to integrate the output signal from the G sensor in order to comply with the requirement for operating the safety device at an earlier time, on the other hand, it may become difficult to satisfy the requirement for operating the safety device at a late or delayed time to a sufficient extent.

SUMMARY OF THE INVENTION

Therefore, the present invention provides a safety device for an automobile vehicle adapted to operate at an appropriate time.

The present invention is a safety device for an automobile vehicle for protecting an operator or a passenger, which comprises:

an acceleration detecting means mounted to a body of the automobile vehicle for detecting a magnitude of longitudinal acceleration acting longitudinally upon the body thereof;

an integration means for integrating an output value generated from the acceleration detecting means so as to give a currently integrated value by reducing a previously integrated value by a predetermined decrement; and a decision means for making decision to determine if the safety device is to be operated on the basis of an integrated value obtained by integration with the integration means.

This configuration according to the present invention can deal with a collision of the vehicle body or the like which satisfies the requirement for operating the safety device at a late or somewhat delayed time by determining the amount of an impact from a moment of the collision or the like on the basis of an integrated value obtained by the integration by the integration means as well as with such a collision or the like which satisfies the requirement for operating the safety device at an earlier time by determining the integrated value computed on the basis of the latest output value generated from the acceleration detecting means.

Further, the present invention is the safety device for an automobile vehicle, wherein the integration means comprises a first integration means and a second integration means and the first integration means is set to make a rate of reducing a previously integrated value greater than the second integration means.

This arrangement of the integration means for the safety device according to the present invention can satisfy the requirement for operating the safety device at an earlier time as well as the requirement for operating the safety device at a late time or at a somewhat delayed time by allowing its two integration means to share the functions of the integration means.

In addition, the present invention is the safety device for an automobile vehicle, wherein the decision means comprises a first decision means and a second decision means. The first decision means is arranged to make a decision on the basis of a first integrated value obtained by the first integration process with the first integration means. The second decision means is arranged to make a decision on the basis of a second integrated value obtained by the second integration process with the second integration means.

This arrangement of the decision means for the safety device according to the present invention can satisfy the requirement for operating the safety device at an earlier time as well as the requirement for operating the safety device at a late time or at a somewhat delayed time to a more sufficient extent, by having its two discrete decision means arranged for their respective two integration means, than, for example a decision means that is designed to make a decision on the basis of the two integrated values.

Furthermore, the present invention is safety device for an automobile vehicle which further comprises a first high-pass filter means and a second high-pass filter means. The first high-pass filter means is so arranged as to remove a low-frequency component from the output value generated from the acceleration detecting means before the first integration process by the first integration means, and the second high-pass filter means is arranged as to remove a low-frequency component of the output value generated from the acceleration detecting means before the second integration process by the second integration means, which has a frequency higher than the low-frequency component thereof to be removed by the first high-pass filter means.

This arrangement of the safety device according to the present invention can deal with the requirement for the operation of the safety device at an earlier time as well as at a late or somewhat delayed time with higher certainty by subjecting the output value generated from the acceleration detecting means to filtering separately and independently to adapt the output value therefrom to two kinds of the integration processes.

Furthermore, the present invention is the safety device for an automobile vehicle which further comprises an amplification means for amplifying the output value generated from the acceleration detecting means prior to the first integration process by the first integration means with a greater amplification rate greater when the output value therefrom is larger, than when the output value therefrom is smaller.

This arrangement of the safety device according to the present invention can especially deal with the requirement for operating the safety device at an earlier time.

Other features and advantages of the present invention will become apparent in the course of the description of the preferred embodiments which follows, with reference to the accompanying drawings.

DETAILED DESCRIPTION OF THE INVENTION

The present invention will be described in more detail with reference to the accompanying drawings.

Figure 1:
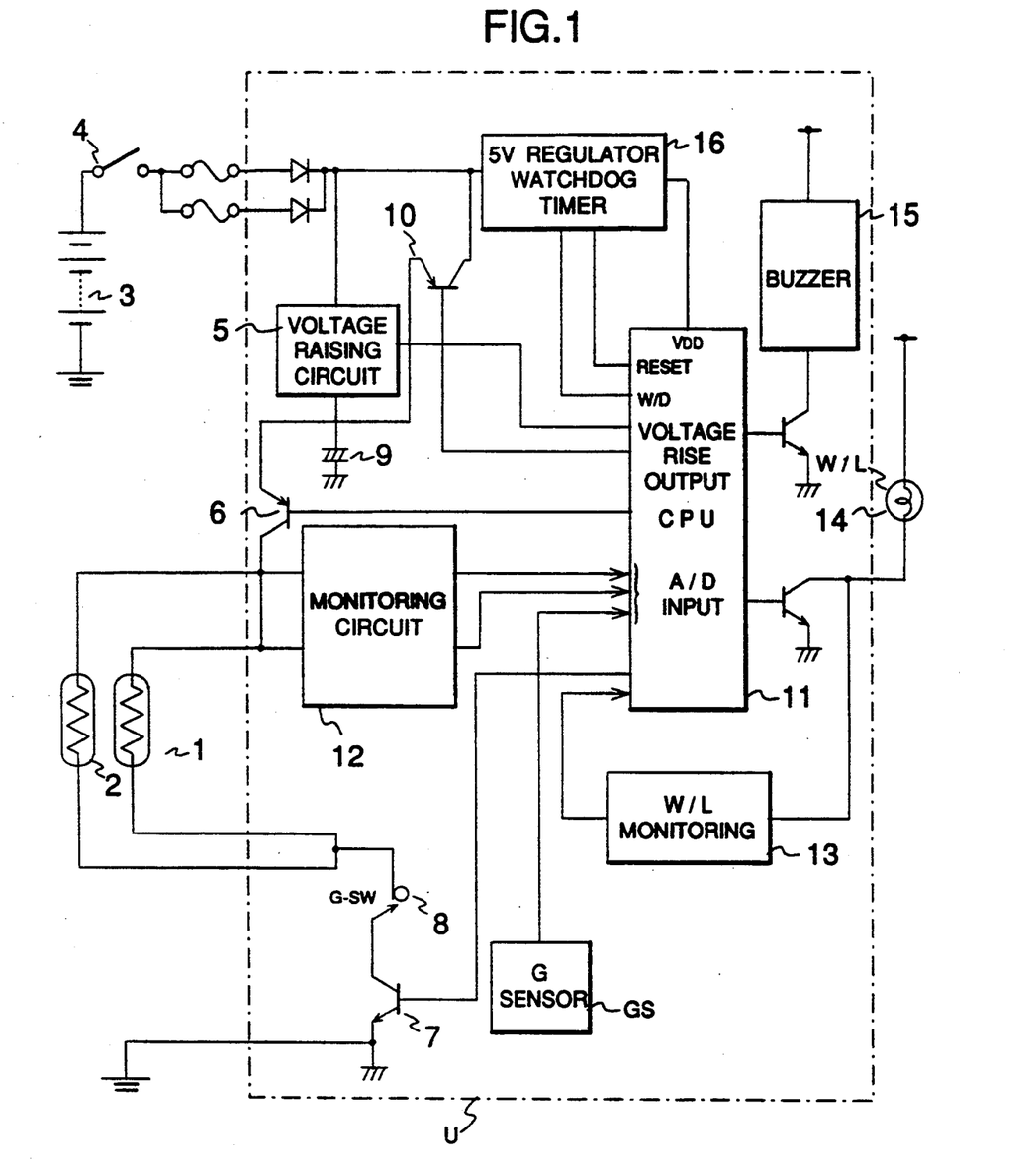
FIG. 1 is a circuit diagram showing an example of a control system for the safety device according to the present invention.

As shown in FIG. 1, reference numerals 1 and 2 denote each an inflator for inflating an air bag with gas having a degree of gas pressure suitable for developing and expanding the air bag. In the embodiment as shown in FIG. 1, the inflator 1 is the air bag provided for an operator and the inflator 2 is the air bag provided for a passenger seated next to the operator.

Reference numeral 3 denotes a battery and reference numeral 4 denotes an ignition switch. The battery voltage passed through the ignition switch 4 is raised with a voltage-raising circuit 5, and the voltage raised by the voltage-raising circuit 5 is used for initiating the inflation of the inflators 1 and 2. The line for supplying the inflators 1 and 2 with electricity from the voltage-raising circuit 5 is provided in a row with switching transistors 6, 7 and a low-G switch 8.

The low-G switch 8 is secured to the vehicle body and it is of such a mechanical structure that it is constantly in an OFF condition yet it turned on when there is applied a relatively low degree of acceleration, for example, 4 G as great as four times of acceleration due to gravity. When the low-G switch 8 is turned on in a state that the ignition switch as well as the switching transistors 6 and 7 are in an ON state, a high voltage from the voltage-raising circuit 5 is applied to the inflators 1 and 2, thereby initiating the inflation of the inflators 1 and 2 as well as expanding and developing the respective air bags within the compartment of the vehicle.

As a power source for initiating the inflation of the inflators 1 and 2, there may be used a back-up power source utilizing a condenser. For a certain period of time after the ignition switch 3 has been turned OFF, the voltage can be applied from the back-up power source to the inflators 1 and 2 by turning on the switching transistor 10.

Reference symbol U denotes a control unit composed of a microcomputer that has a central processing unit (CPU) 11. Into the CPU 11 are entered signals from a G sensor (an acceleration sensor) GS mounted to the vehicle body and monitoring circuits 12 and 13. The CPU 11 generates output signals to the voltage-raising circuit 5, the switching transistors 6, 7, 10, an alarm lamp 14, and an alarm buzzer 15. The monitoring circuit 12 is so adapted as to detect a failure, such as disconnection of a line for applying electricity to the alarm lamp 14 and so on. If the alarm lamp 14 does not work, the CPU 11 makes the alarm buzzer 15 working. On the other hand, a failure of the CPU 11 is monitored by a watchdog timer 16.

Figure 2:
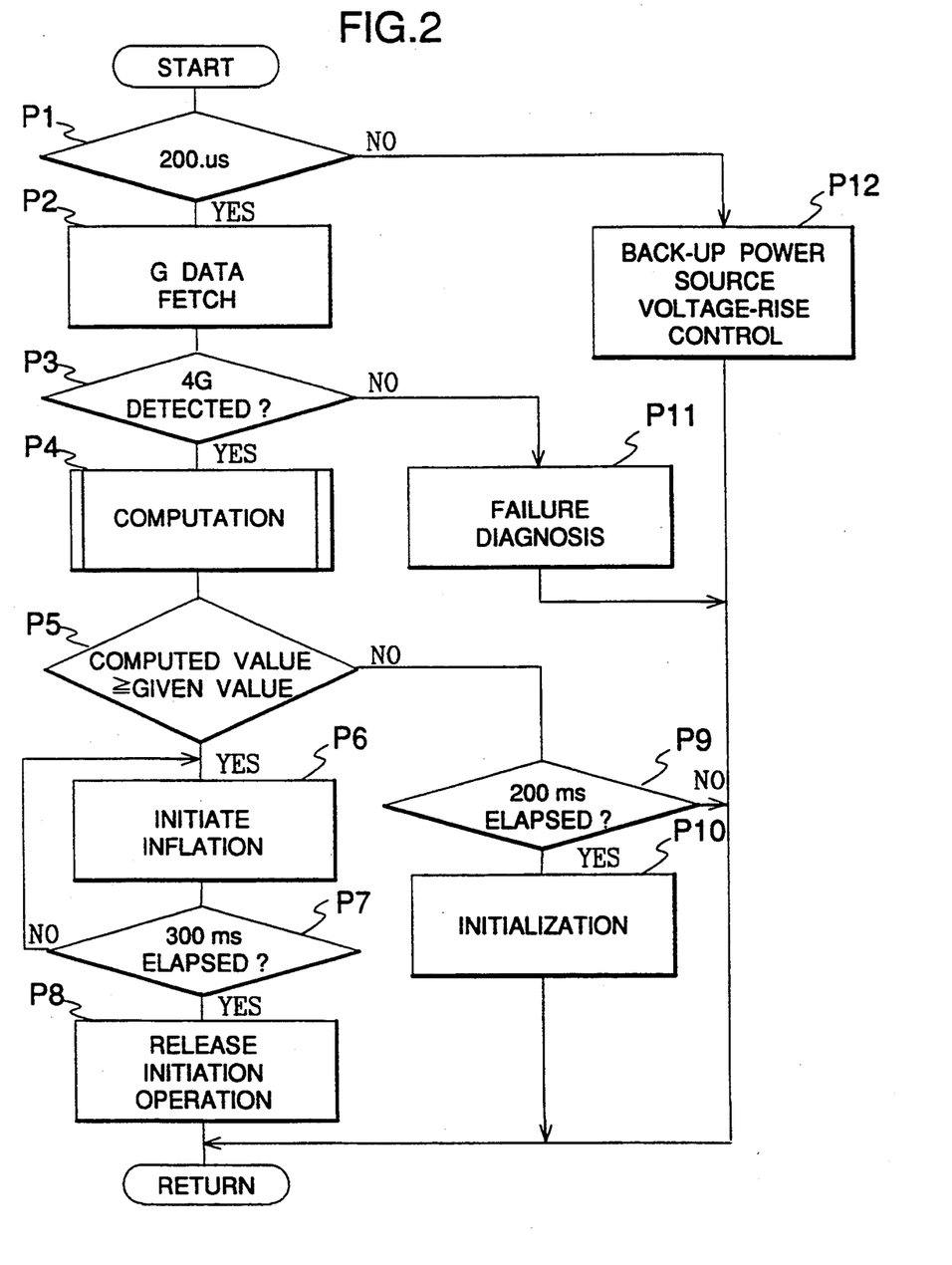
FIG. 2 is a flowchart showing an example of control over the safety device according to the present invention.

A description will be made of an outline of the contents of the control to be performed by the CPU 11 of the control unit U.

First, at step P1, it is decided to determine if a predetermined time is set to every 200 microseconds. When the result of decision at step P1 indicates that the predetermined time is set to every 200 microseconds, then the program flow goes to step P2 at which a signal generated from the G sensor GS is fetched, followed by proceeding to step P3 at which it is decided to determine if the acceleration having 4 G (where G is the unit of gravitational acceleration) or higher was detected by the G sensor GS.

When the decision gives the affirmative result at step P3, then the program flow goes to step P4 at which computation is made to give an output wave form in a way as will be described hereinafter. Then, at step P5, a decision is made to determine if the result of computation obtained at step P4 is equal to or larger than a predetermined value. When it is decided at step P5 that the result of computation is equal to or larger than the predetermined value, then the program flow goes to step P6 at which the inflation of the inflators 1 and 2 is initiated by turning on the switching transistors 6 and 7, respectively. Thereafter, the program flow goes to step P7 at which it is decided to determine if 300 milliseconds have elapsed after the switching transistors 6 and 7 were turned ON. When the decision at step P7 gives the negative result, then the program flow is returned to step P6, thereby keeping turning on the switching transistors 6 and 7. On the other hand, when the decision at step P7 gives the affirmative result, then the program flow goes to step P8 at which the switching transistors 6 and 7 were turned OFF suspending the subsequent operation for initiating the inflation of the inflators 1 and 2.

On the other hand, when it is decided at step P5 that the result of computation is smaller than the predetermined value, then the program flow goes to step P9 at which 200 milliseconds have elapsed after the magnitude of the acceleration as great as 4 G was detected. The period of 200 milliseconds is the time longer than the longest time required for expanding and developing the air bag after the magnitude of the acceleration as great as 4 G or higher was detected, that is, the time after it has been confirmed that the expansion and development of the air bag was not needed any longer. When the decision at step P9 gives the affirmative result, then the program flow goes to step P10 at which a variety of parameters are cleared.

When it is decided at step P3 that the magnitude of the acceleration as great as 4 G or higher was detected by the G sensor GS, then the program flow goes to step P11 at which a failure of the control system may be diagnosed by utilizing the monitoring circuits 12 and 13.

Further, when it is decided at step P1 that the predetermined time is not set to every 200 microseconds, then the program flow goes to step P12 at which the voltage-raising circuit 5 is controlled in order to raise the voltage.

Figure 3:
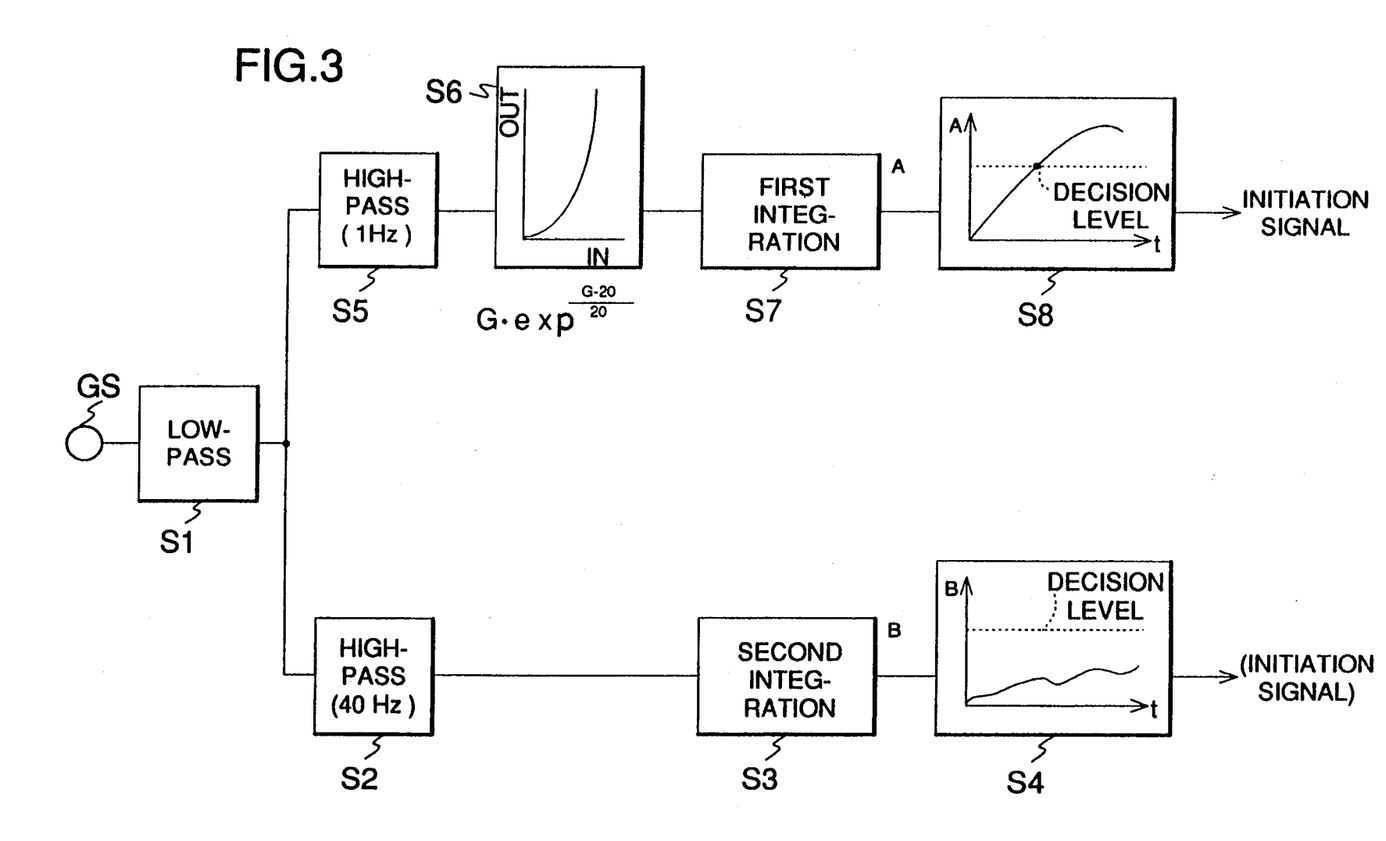
FIG. 3 is a block diagram showing a section involved in the computation of the output value from the G sensor and a section involved in the decision of the values obtained by the computation of the output value generated from the G sensor.

A detailed description will now be made of the processes at steps P4 and P5 with reference to FIG. 3.

The output signal (output value) generated from the G sensor GS is caused to pass through a low-pass filter S1 to thereby remove high-frequency components from the output signal, followed by the processes at steps S5–S8 and the processes at steps S2–S4. The processes at steps S5–S8 are adapted so as to compete with the collision of the vehicle body at such a high speed as damaging or destroying the body of the vehicle and causing the operator or the passenger likely to be injured to a severe extent. On the other hand, the processes at steps S2–S4 are adapted so as to compete with the collision of a vehicle body at such a low speed as causing the operator or the passenger unlikely to be injured whatsoever or to a severe extent even if a portion of the body of the vehicle would be distorted or destroyed.

In the processes that are so adapted as to compete with the collision of the vehicle body at a high speed, only the high-frequency components having a frequency of 1 Hz or greater (yet up to 40 Hz) are removed from the output signal generated from the G sensor GS by passing the output signal through the high-pass filter S5. Thereafter, the output value is amplified with an amplification circuit S6. In this embodiment, the amplification by the amplification circuit S6 may be carried out exponentially in accordance with the formula as will be described hereinafter:

$$G \cdot \exp \frac{G-20}{20}$$

where exp is the bottom of the natural logarithm.

In the above formula, the amplification ratio is set so as to become 1 at 20 G and to become larger as the input value is larger when the input value larger than 20 G is entered, thereby focusing emphasis on the peak value. Further, it can be noted that when the input value is smaller than 20 G, the amplification ratio is set so as to become smaller as the input value is smaller, even if the amplification ratio is smaller than 1. In other words, the amplification ratio is substantially reduced in this region.

It should be noted herein that, since a peak value that may singly occur as a noise during the running of the vehicle on a bad road indicates approximately 10 G in usual cases, the acceleration as great as 20 G is set so as not to cause such noises to be amplified. Hence, the numeral "20" in the above formula may optionally be chosen from the range of approximately 10–20. It can further be noted that the amplification ratio can be altered so as to carry out the amplification in a linear manner.

After the amplification by the amplification circuit S6, the output signal is subjected to integration by a first integration circuit S7 in a manner as will be described hereinafter. Thereafter, the resulting first integrated value A is entered into a decision circuit S8. In the decision circuit S8, an initiation signal is generated for initiating the inflation of the inflators and 2 when the first integrated value A has exceeded a predetermined decision level—a predetermined value in this embodiment.

Figure 4:
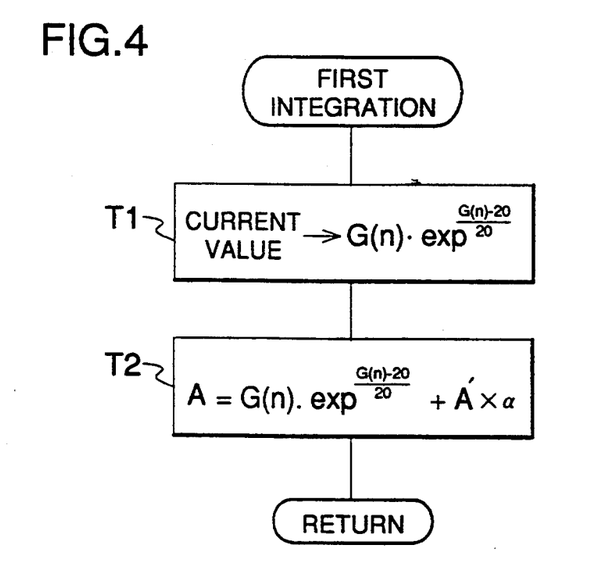
FIG. 4 is a flowchart showing an example of the first integration process performed by the first integration means.

The first integration process with the first integration circuit S7 is carried out in a manner as indicated in FIG. 4. First, at step T1, the output value G(n) generated from the G sensor GS is read into the above-defined formula through the amplification circuit S6 and the currently integrated value (A) is consequently read as the following formula:

$$A = G(n) \cdot \exp \frac{G(n)-20}{20}$$

Then, at step T2, the currently integrated value (A) is computed as follows:

$$A = G(n)x \exp \{G(n)-20\}/20 + A'x\alpha$$

where A' is the previously integrated value; and
α is the decrement coefficient larger than 0 yet smaller than 1 (0<α<1).

More specifically, the computation at step T2 is performed by adding the product obtained by multiplying the previously integrated value (A') by the predetermined decrement coefficient α to the current value, i.e. G(n).exp [G(n)−20/20], read at step T1. In other words the currently integrated value (A) to be used for the decision process for determining the initiation of the inflation of the inflators 1 and 2 is not the value that is obtained merely by integrating the output value previously generated from the G sensor GS, and the magnitude of the previously integrated value (A') as the object to be added to the output value generated from the G sensor GS is subjected to processing for reducing its value to a smaller value by multiplying the output value with the decrement coefficient $\alpha$ having a value smaller than 1.

Further, it can be noted that, in place of the decrement coefficient $\alpha$, a decrement value a ($>0$) may be used. In this case, the decrement value a is subtracted from the previously integrated value (A') and the currently integrated value (A) is computed by adding the resulting subtracted value to the output value generated from the G sensor GS and entered into the amplification circuit S6. The formula for this computation can be expressed as follows:

$$A = G(n) \times \exp^{\{G(n)-20\}/20} + (A'-a)$$

In this case, it should be noted that the decrement value a is subtracted from the previously integrated value (A'), whatever value the previously integrated value has, so that it is preferred that the decrement coefficient $\alpha$ be used in terms of reducing the output value in a stable manner. It can be noted, however, that in order to provide a stable reduction in the output value, it is preferred to use the decrement value a by setting it so as to become gradually larger as the time elapses.

On the other hand, in the processes that are so adapted as to compete with the collision of the vehicle body at the low speed, only the high-frequency components having a frequency of 40 Hz or greater are removed from the output signal generated from the G sensor GS by passing the output signal through the high-pass filter S2. Thereafter, the resulting output value is entered into a second integration circuit S3 that integrates it in a manner as will be described hereinafter, thereby producing the resulting second integrated value B. Thereafter, the resulting second integrated value B is entered into a decision circuit S4. In the decision circuit S4, an initiation signal is generated for initiating the inflation of the inflators 1 and 2 when the first integrated value B has exceeded a predetermined decision level—a predetermined value in this embodiment.

Figure 5:
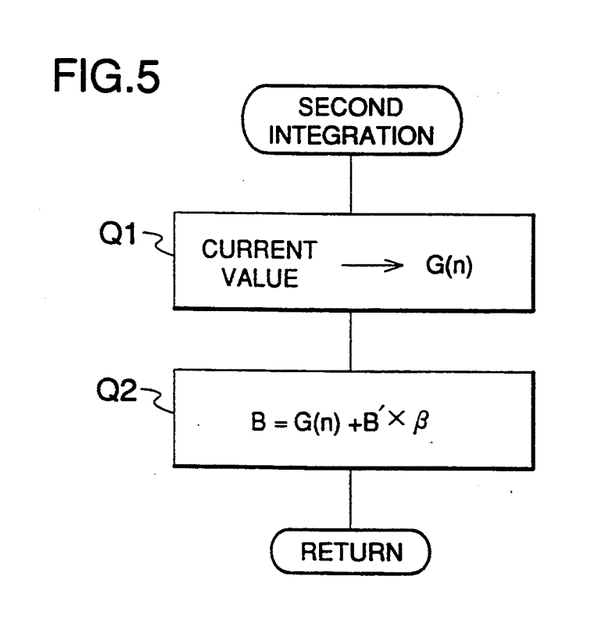
FIG. 5 is a flowchart showing an example of the second integration process performed by the second integration means.

The second integration process by the second integration circuit S3 can be carried out in substantially the same manner, as shown in FIG. 5, as the first integration by the first integration circuit S7, with the exception that the output value generated from the G sensor GS is read directly without the interposition of any amplification circuit, unlike the first integration process. In other words, the current input value read at step Q1 is indicated as G(n), followed by proceeding to step Q2 at which the currently integrated value (B) is computed as follows:

$$B = S(n) + B' \times \beta$$

where B' is the previously integrated value;
$\beta$ is the decrement coefficient larger than 0 and equal to or smaller than 1 yet larger than the decrement coefficient $\alpha (0 < \alpha \leq \beta 1)$.

In addition, it can be noted that, in place of the decrement coefficient $\beta$, a decrement value b equal to or greater than 0 yet smaller than the decrement value a may be used. In this case, the decrement value b is subtracted from the previously integrated value (B') and the currently integrated value (B) is computed by adding the resulting subtracted value to the output value generated from the G sensor GS. The formula for this computation can be expressed as follows:

$$B = G(n) + (B' - b)$$

where b is the decrement coefficient equal to or larger than 0 yet smaller than the decrement coefficient $\alpha$ ($0 \leq b < a$).

As is apparent from the description above, each of the integration circuits S3 and S7 is so arranged as to reduce the previously integrated values (A') and (B'), respectively, by the predetermined decrement. Further, the rate of reduction is set in such a manner that the output value from the G sensor GS is reduced at a rate larger in the first integration circuit S7 than in the second integration circuit S3. The preferred values for the decrement coefficients $\alpha$ and $\beta$ are set to 0.99 and 0.995, respectively. It can be noted herein, however, that no substantial reduction can be made in the second integration circuit S3 by setting the decrement coefficient $\beta$ to 1 or the decrement value b to 0.

In the processes at steps S5-S8 which reflect the processing in order to compete with the collision of the car at the high speed, the first integrated value A obtained by the first integration circuit S7 heavily reflects the current value as expressed by $G(n) \times \exp\{(G(n)-20)/20\}$. Hence, the first integrated value A can become larger quickly when the output value generated from the G sensor GS becomes larger, thereby capable of operating the safety device such as the air bag as quick as possible. Further, it can be noted herein that, since the output value from the G sensor GS is integrated, the first integrated value A reflects the amount of an impact from the very moment of the collision of the vehicle body, thereby operating the air bag at a relatively delayed time at the time of the collision at the low speed.

Although the matters as have been described immediately hereinabove on the processes at steps S5-S8 can be the same as in the processes at steps S2-S4 which reflect the processing in order to compete with the collision of the car at the low speed, the processes at steps S2-S4 are more suitable for the operation of the safety device at a delayed time because the second integration circuit S3 is so adapted as to reflect the current value G(n) upon the second integrated value B to an extent lesser than the first integration circuit S7 is.

In addition, the use of the high-pass filter S5 becomes more appropriate for the operation of the safety device at an earlier time because the high-pass filter S5 can promote the tendency that the first integrated value A, that is, the rate of the output value having the high-frequency components containing a larger amount of low-frequency components, becomes larger than the high-pass filter S2. It can be noted herein, however, that this relationship is reversed in the processes containing the high-pass filter S2.

Furthermore, as the amplification circuit S6 can give the first integrated value A that reflects the peak value of the output values generated from the G sensor GS more heavily, the processes containing the amplification circuit S6 is more suitable for the operation of the safety device at an earlier time. On the other hand, this relationship is reversed in the processes containing no amplification circuit S6 and corresponding more closely to the collision at the low speed.

Further, the safety device according to the present invention is provided discretely and independently with the two decision circuits S4 and S8, so that the time of operating the safety device can be set more appropriately than the safety device having only one decision circuit that is arranged so as to make a decision on the basis of the sum of the first integrated value A and the second integrated value B.

It can be noted herein that the first integrated value A obtained by the first integration circuit S7 is more suitable for dealing with the collision that causes a portion of the vehicle body to be crashed or broken yet that does not cause the operator and the passengers likely to be injured whatsoever or to a severe extent. More specifically, as the car collides with another car or a foreign matter to such an extent that a portion of the body of the vehicle is crashed or broken yet neither operator nor passengers are likely to be injured, the output value generated from the G sensor GS once indicates a comparatively large peak value, followed by smaller output values during the period of time during which the portion of the vehicle body is distorted or destroyed and again by the re-occurrence of a relatively large peak at the time when the distortion or destruction of the vehicle body has reached its limit. In this case, the first integrated value A becomes larger on the basis of the peak value that has re-occurred, thereby allowing the safety device to be operated at an appropriate time when the distortion or destruction of the body has reached the limit.

On the other hand, when the car collides with another car or a foreign matter at a very low speed to such an extent that no safety device is allowed to be operated, no second peak value does not occur although a relatively large peak value occurs at the very initial stage of the collision. Hence, this case of collision can be distinguished from the case of collision that requires the safety device to be operated, and this distinction is preferred to operate the safety device with higher certainty at the time of the collision at a low speed. This advantage can be promoted by amplifying the peak value with the amplification circuit S6 with the focus thereon.

The present invention has thus been shown and described with reference to specific examples, however, it should be noted that the invention is in no way limited to the details of the illustrated arrangements but changes and modifications may be made without departing from the scope and the spirit of the appended claims.

What is claimed is:

1. A safety device for an automobile vehicle to protect an operator or a passenger, comprising:
    acceleration detecting means mounted to a body of the automobile vehicle for detecting a magnitude of longitudinal acceleration acting longitudinally upon the body thereof;
    integration means for integrating an output value generated from said acceleration detecting means so as to give a currently integrated value by adding a current output detected by said acceleration detecting means to a value obtained by decreasing a predetermined decrement from a previously integrated value; and
    decision means for making decision to determine if said safety device is to be operated on the basis of said currently integrated value obtained by said integration means.

2. A safety device for an automobile vehicle as claimed in claim 1, wherein
    said integration means comprises a first integration means and a second integration means; and
    said first integration means is set so as to make a rate of decreasing a previously integrated value larger than said second integration means.

3. A safety device for an automobile vehicle as claimed in claim 2, wherein
    said decision means comprises a first decisions means and a second decision means;
    said first decision means for making decision on the basis of a first integrated value obtained by said first integration means;
    said second decision means for making decisions make decision on the basis of a second integrated value obtained by said second integration means; and
    said safety device is operated when at least one of said first decision means and said second decision means decides that an operation of said safety device is to be started.

4. A safety device for an automobile vehicle as claimed in claim 2, said safety device further comprising:
    first high-pass filter means and second high-pass filter means;
    wherein said first high-pass filter means removes a low-frequency component from the output value generated from said acceleration detecting means before integration by said first integration means; and
    said second high-pass filter means removes a low-frequency component of the output value generated from said acceleration detecting means before integration by said second integration means, which has a frequency higher than the low-frequency component thereof to be removed by said first high-pass filter means.

5. A safety device for an automobile vehicle as claimed in claim 1, said safety device further comprising:
    an amplification means for amplifying the output value generated from said acceleration detecting means, prior to the integration by said integration means, at an amplification rate which is greater when the output value from said acceleration detecting means exceeds a predetermined value than when the output value from said acceleration detecting means is less than the predetermined value.

6. A safety device for an automobile vehicle as claimed in claim 4, said safety device further comprising a low-pass filter means for removing a high-frequency component from the output value generated from said acceleration detecting means, said low-pass filter means being disposed before said first high-pass filter means and said second high-pass filter means.

7. A safety device for an automobile vehicle as claimed in claim 2, said safety device further comprising an amplification means for amplifying the output value generated from said acceleration detecting means, prior to the integration by said first integration means, at an amplification rate greater when the output value from said acceleration detecting means exceeds a predetermined value than when the output value from said acceleration detecting is less than the predetermined value.

8. A safety device for an automobile vehicle as claimed in claim 7, said safety device further comprising:
- a low-pass filter means for removing a high-frequency component from the output value generated from said acceleration detecting means;
- a first high-pass filter means for removing a low-frequency component from the output value generated from said acceleration detecting means and passed through said low-pass filter means before integration by said first integration means; and
- a second high-pass filter means for removing a low-frequency component of the output value generated from said acceleration detecting means and passed through said low-pass filter means before integration by said second integration means, which has a frequency higher than the low-frequency component thereof to be removed by said first high-pass filter means.

9. A safety device for an automobile vehicle to protect an operator or a passenger, comprising
- acceleration detecting means mounted to a body of the automobile vehicle for detecting a magnitude of longitudinal acceleration acting longitudinally upon the body thereof;
- integration means for integrating an output value generated from said acceleration detecting means so as to give a currently integrated value by adding a current output detected by said acceleration detecting means to a value obtained by decreasing a previously integrated value by a predetermined decrement from a previously integrated value;
- decision means for making decision to determine if said safety device is to be operated on the basis of said currently integrated value obtained by said integration means; and
- amplification means for amplifying the output value generated from said acceleration detecting means, prior to the integration by said integration means, at an amplification rate which is greater when the output value from said acceleration detecting means is less the predetermined value than when the output value from said acceleration detecting means less the predetermined value,
- wherein said amplification means is so set as to amplify the output value generated from said acceleration detecting means in an exponential fashion.

10. A safety device for an automobile vehicle as claimed in claim 9, wherein said amplification rate at which said amplification means amplifies is set to be substantially reduced by[:]
- (a) setting said amplification rate to one when the magnitude of acceleration detected by said acceleration detecting means is equal to a predetermined value;
- (b) setting to a value greater than one when the magnitude of acceleration detected by said acceleration detecting means is greater than said predetermined value; and
- (c) setting to a value smaller than one when the magnitude of acceleration detected by said acceleration detecting means is smaller than said predetermined value.

11. A safety device for an automobile vehicle as claimed in claim 10, wherein said predetermined value is set to a range of from approximately 10 G to 20 G wherein G is the magnitude of gravitational acceleration.

12. A safety device for an automobile vehicle as claimed in claim 1, wherein said safety device is in the form of an air bag or of a pretension-type seat belt.

13. A safety device for an automobile vehicle as claimed in claim 1, said safety device further comprising a switch means responsive to acceleration, which is mounted to the body thereof and arranged to be turned ON when the magnitude of the longitudinal acceleration acting longitudinally upon the body becomes equal to or greater than the predetermined value
- wherein said safety device is activated when said switch means is turned ON and
- said magnitude of the longitudinal acceleration is set to a substantially small value as said switch means is turned ON.

14. A safety device for an automobile vehicle to protect an operator or a passenger, comprising
- acceleration detecting means mounted to a body of the automobile vehicle for detecting a magnitude of longitudinal acceleration acting longitudinally upon the body thereof;
- integration means for integrating an output value generated from said acceleration detecting means so as to give a currently integrated value by adding a current output detected by said acceleration detecting means to a value obtained by decreasing a previously integrated value by a predetermined decrement from a previously integrated value;
- decision means for making decision to determine if said safety device is to be operated on the basis of said currently integrated value obtained by computation with said integration means, wherein
- said integration means is set so as to give said currently integrated value (A) on the basis of formula as follows:

$$A = Y + A' \times \alpha$$

wherein
- A is the currently integrated value;
- is a current value detected currently by said acceleration detecting means;
- A' is a previously integrated value; and
- α is a decrement coefficient smaller than 1.

15. A safety device for an automobile vehicle to protect an operator or a passenger, comprising
- acceleration detecting means mounted to a body of the automobile vehicle for detecting a magnitude of longitudinal acceleration acting longitudinally upon the body thereof;.
- integration means for integrating an output value generated from said acceleration detecting means so as to give a currently integrated value by adding a current output detected by said acceleration detecting means to a value obtained by decreasing a previously integrated value by a predetermined decrement from a previously integrated value;
- decision means for making decision to determine if said safety device is to be operated on the basis of an integrated value obtained by computation with said integration means,
- wherein said integration means gives said currently integrated value (A) on the basis of formula as follows:

$$A = Y + (A' - a)$$

wherein

A is the currently integrated value;
Y is an output value generated from said acceleration detecting means;
A' is a previously integrated value; and
a is a decrement value greater than 0.

16. A safety device for an automobile vehicle to protect an operator or a passenger, comprising acceleration detecting means mounted to a body of the automobile vehicle for detecting a magnitude of longitudinal acceleration acting longitudinally upon the body thereof;
integration means for integrating an output value generated from said acceleration detecting means so as to give a currently integrated value by adding a current output detected by said acceleration detecting means to a value obtained by decreasing a previously integrated value by a predetermined decrement from a previously integrated value;
decision means for making decision to determine if said safety device is to be operated on the basis of said currently integrated value obtained by said integration means;
wherein said integration means further comprises first and second integration means, and said first integration means is set to make a rate of decreasing a previously integrated value larger than said second integration means, wherein
said first integration means is set so as to give said currently integrated value (A) on the basis of formula (1) as follows:

$$A = Y + A' \times \alpha \qquad (1)$$

wherein
A is the currently integrated value;
Y is a current value detected currently by said acceleration detecting means;
A' is a previously integrated value; and
$\alpha$ is a decrement coefficient smaller than 1;
and said second integration means is set so as to give said currently integrated value (B) on the basis of formula (2) as follows:

$$B = Z + B' \times \beta \qquad (2)$$

wherein B is the currently integrated value;
Z is a current value detected currently by said acceleration detecting mean;
B' is a previously integrated value; and
$\beta$ is a decrement coefficient smaller than 1
and equal to or greater than the decrement coefficient $\alpha (0 < \alpha < \beta 1)$.

17. (Amended) A safety device for an automobile vehicle to protect an operator or a passenger, comprising acceleration detecting means mounted to a body of the automobile vehicle for detecting a magnitude of longitudinal acceleration acting longitudinally upon the body thereof;
integration means for integrating an output value generated from said acceleration detecting means so as to give a currently integrated value by adding a current output detected by said acceleration detecting means to a value obtained by decreasing a previously integrated value by a predetermined decrement from a previously integrated value;
decision means for making decision to determine if said safety device is to be operated on the basis of said currently integrated value obtained by said integration means;
wherein said integration means further comprises first and second integration means, and said first integration means is set to make a rate of decreasing a previously integrated value larger than said second integration means, wherein
said first integration means gives said currently integrated value (A) on the basis of formula (3) as follows:

$$A = Y + (A' - b) \qquad (3)$$

wherein
A is the currently integrated value;
Y is an output value generated from said acceleration detecting means;
A' is a previously integrated value; and
a is a decrement value greater than 0;
and said second integration means gives said currently integrated value (B) on the basis of formula (4) as follows:

$$B = Z + (B' - b) \qquad (4)$$

wherein
B is the currently integrated value;
Z is a current value detected currently by said acceleration detecting mean;
B' is a previously integrated value; and
b is a decrement value equal to or greater than 0 and smaller than the decrement value a (0b < a).

18. A safety device for an automobile vehicle as claimed in claim 1, wherein said decision means is determine if said safety device is to be operated when said currently integrated value obtained by said integration means is equal to or greater than a predetermined threshold value.

19. A safety device for an automobile vehicle as claimed in claim 1, wherein said acceleration detecting means as detect the magnitude of acceleration continually and variably.

* * * * *